US012746510B2

(12) United States Patent
Liu et al.

(10) Patent No.: US 12,746,510 B2
(45) Date of Patent: Sep. 29, 2026

(54) MULTI-LAYER TWC FORMULATIONS WITH OPTIMALIZED PGM LOADINGS

(71) Applicant: JOHNSON MATTHEY PUBLIC LIMITED COMPANY, London (GB)

(72) Inventors: Dongxia Liu, Wayne, PA (US); Maria C. Vlachou, Reading (GB); Amy Louise Kolpin, Reading (GB); Peter Charles Stonehouse, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 19/015,939

(22) Filed: Jan. 10, 2025

(65) Prior Publication Data

US 2025/0229227 A1 Jul. 17, 2025

Related U.S. Application Data

(60) Provisional application No. 63/620,887, filed on Jan. 15, 2024.

(51) Int. Cl.
*B01D 53/94* (2006.01)
*B01J 23/56* (2006.01)

(52) U.S. Cl.
CPC ....... *B01D 53/945* (2013.01); *B01D 53/9454* (2013.01); *B01J 23/56* (2013.01);
(Continued)

(58) Field of Classification Search
CPC .............. B01D 53/945; B01D 53/9454; B01D 2255/1023; B01D 2255/1025; B01D 2255/2042; B01D 2255/407; B01D 2255/9027; B01D 2255/908; B01D 2258/01; B01D 2255/9025; B01D 2255/903; B01D 2258/014; B01J 23/56; B01J 2523/00; B01J 2523/25; B01J 2523/822; B01J 23/002; B01J 23/58;
(Continued)

(56) References Cited

U.S. PATENT DOCUMENTS 7,517,510 B2 4/2009 Chen
7,758,834 B2 7/2010 Chen
(Continued)

FOREIGN PATENT DOCUMENTS

WO 2010140780 A2 12/2010

OTHER PUBLICATIONS

H Goto et al—"Impact of Pd—Rh Interaction on the Performance of Three-Way Catalysts" SAE 2014-01-1503.
(Continued)

*Primary Examiner* — Coris Fung
*Assistant Examiner* — Remy Frederic Lalisse
(74) *Attorney, Agent, or Firm* — BakerHostetler

(57) ABSTRACT

A catalyst article for treating exhaust gas comprising: a substrate comprising an inlet end, an outlet end with an axial length L; a first catalytic region comprising a first palladium component; a second catalytic region comprising a second rhodium component; a third catalytic region comprising a third palladium component; wherein the first catalytic region is adjacent to the second catalytic region; and wherein the first palladium component and the second rhodium component have a weight ratio of from 3:1 to 19:1, based on element.

20 Claims, 6 Drawing Sheets

(52) U.S. Cl.
CPC ................ *B01D 2255/1023* (2013.01); *B01D 2255/1025* (2013.01); *B01D 2255/2042* (2013.01); *B01D 2255/407* (2013.01); *B01D 2255/9027* (2013.01); *B01D 2255/908* (2013.01); *B01D 2258/01* (2013.01)

(58) Field of Classification Search
CPC ........ B01J 35/56; B01J 35/57; B01J 37/0244; F01N 2510/0684; F01N 3/101
USPC .......................................................... 502/304
See application file for complete search history.

(56) References Cited

U.S. PATENT DOCUMENTS

| | | | | |
|---|---|---|---|---|
| 8,038,951 | B2 | 10/2011 | Wassermann | |
| 2020/0391187 | A1 | 12/2020 | Ji | |
| 2021/0205788 | A1* | 7/2021 | Kadono | B01J 37/038 |
| 2021/0262371 | A1 | 8/2021 | Chen | |
| 2023/0364588 | A1 | 11/2023 | Strehlau | |
| 2024/0001343 | A1 | 1/2024 | Qiao | |

OTHER PUBLICATIONS

Y Tomida—"A study of ageing effect: Migration of rhodium under air atmosphere", Catalysis Today, 376(2021) 81-86.

* cited by examiner

MULTI-LAYER TWC FORMULATIONS WITH OPTIMALIZED PGM LOADINGS

FIELD OF THE INVENTION

The present invention relates to a catalyzed article useful in treating exhaust gas emissions from gasoline engines.

BACKGROUND OF THE INVENTION

A three-way catalyst (TWC) allows simultaneous conversions (~98%) of CO, HCs and $NO_x$ from gasoline engine exhaust to innocuous compounds at stoichiometric air-to-fuel ratio. Specifically, the oxidation of CO and HCs to $CO_2$ and steam ($H_2O$) is mainly catalyzed by Pd, while the reduction of $NO_x$ to $N_2$ is mainly catalyzed by Rh. Modern TWCs use supported platinum group metal (hereinafter "PGM") catalysts (Pd, Rh, Pt, etc.) deposited on a single, double or multilayer support, with the support material consisting of metal oxides with high specific surface area, primarily stabilized alumina and ceria-containing oxygen storage materials. The supported catalyst is subsequently washcoated on a ceramic monolithic substrate. Among the platinum group metals, Rh is the scarcest in the planet and the most expensive species. Thus, making Rh highly activated is the most critical request for maintaining outstanding TWC performance.

Rh sintering occurs due to exposure to the high temperature in the lifetime usage of a three-way catalytic converter, which decreases the active Rh catalytic sites and thus leading to activity deterioration. In addition, Rh migration is another import reason that causes TWC deactivation. Tomida and others [1] reported the severe migration of rhodium from one support to another under high temperature air atmosphere (lean condition) through EPMA and XPS analysis. It is reasonable to extrapolate that Rh would also migrate from the inlet side of a coated monolith to the outlet side and/or between multiple washcoat layers.

Blending some Pd into Rh washcoat layer was reported previously as a common approach to stabilize rhodium by forming Pd—Rh alloy. Goto and others [2] mentioned that when presence of both Pd and Rh in the same washcoat, it is beneficial to have proximity of Pd and Rh nanoparticles without forming PdRh alloy with a core-shell structure, the latter of which is well known for inferior TWC activity. However, Pd and Rh in the same washcoat sometimes shows detrimental NOx reduction behavior for certain situations due to "over-oxidation" of the reductants such as $CO/H_2/THC$, limiting its applications to broader TWC communities.

This invention, however, utilizes Rh migration phenomena by building a "Pd nest" layer/region to trap the migrated Rh to form adjacent Pd—Rh nanoparticles. By carefully controlling the Pd loading in the nest which is high enough to trap Rh but not too much to form PdRh alloy with Pd core-Rh shell structure, a significant improvement of TWC activities has been successfully achieved.

Non-Patent References

[1] Tomida et al., "A study of ageing effect: Migration of rhodium under air atmosphere," Catalysis Today, vol. 376, 2021, 81-86

[2] Goto et al., "*Impact of Pd—Rh interaction on the performance of three-way catalysts*," No. 2014-01-1503. SAE Technical Paper, 2014.

SUMMARY OF THE INVENTION

One aspect of the present disclosure is directed to a catalyst for treating gasoline engine exhaust gas comprising: a substrate comprising an inlet end, an outlet end with an axial length L; a first catalytic region comprising a first palladium component; a second catalytic region comprising a second rhodium component; a third catalytic region comprising a third palladium component; wherein the first catalytic region is adjacent to the second catalytic region; and wherein the first palladium component and the second rhodium component have a weight ratio of from 3:1 to 19:1, based on element.

The invention also encompasses an exhaust system for internal combustion engines that comprises the three-way catalyst component of the invention.

The invention also encompasses treating an exhaust gas from an internal combustion engine, in particular for treating exhaust gas from a gasoline engine. The method comprises contacting the exhaust gas with the three-way catalyst component of the invention.

DETAILED DESCRIPTION OF THE INVENTION

Figure 1A:
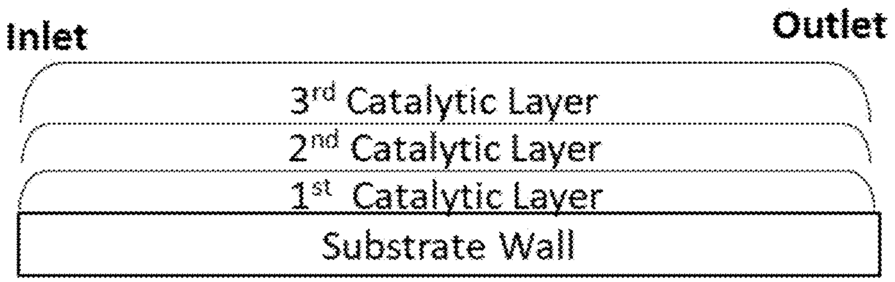
FIG. 1*a* depicts a configuration in which first catalytic region is a bottom layer directly deposited on the substrate, second catalytic region is a middle layer, and third catalytic region is a top layer.

The present invention is directed to the catalytic treatment of combustion exhaust gas, such as that produced by gasoline and other engines, and to related catalysts and systems. More specifically, the invention relates the simultaneous treatment of $NO_x$, CO, and HC in a vehicular exhaust system. The inventors have discovered an optimal weight ratio between the certain catalytically active metals in the adjacent layers/regions and their ways of coating that unexpectedly produces a high conversion rate for $NO_x$, CO, and HC and improves the performance in cold start stage.

One aspect of the present disclosure is directed to a catalyst for treating gasoline engine exhaust gas comprising: a substrate comprising an inlet end, an outlet end with an axial length L; a first catalytic region comprising a first palladium component; a second catalytic region comprising a second rhodium component; a third catalytic region comprising a third palladium component; wherein the first catalytic region is adjacent to the second catalytic region; and wherein the first palladium component and the second rhodium component have a weight ratio of from 3:1 to 19:1, based on element.

First Catalytic Region

The first catalytic region can comprise PGM metals other than the first palladium component, such as platinum.

The first catalytic region can comprise 3-380 g/ft$^3$ of the first palladium component. Preferably, the first catalytic region can comprise 5-200 g/ft$^3$ of the first palladium component, more preferably, 10-100 g/ft$^3$ of the first palladium component.

In some embodiments, the first palladium component and the second rhodium component can have a weight ratio of from 3:1 to 18:1. Preferably, the first palladium component and the second rhodium component can have a weight ratio of from 4:1 to 17:1. More preferably, the first palladium component and the second rhodium component have a weight ratio of from 5:1 to 15:1. Most preferably, the first palladium component and the second rhodium component have a weight ratio of from 5:1 to 10:1.

In some embodiments, the first catalytic region can extend for 100 percent of the axial length L. In other embodiments, the first catalytic region can extend for 50 to 99 percent of the axial length L; preferably, the first catalytic region can extend for 55 to 99 percent; more preferably, 60 to 95 percent; even more preferably 70 to 90 percent of the axial length L.

The total washcoat loading of the first catalytic region can be less than 3.5 g/in$^3$, preferably, less than 3.0 g/in$^3$, 2.5 g/in$^3$, less than 1.5 g/in$^3$ or 1.0 g/in$^3$.

The first catalytic region can further comprise a first oxygen storage capacity (OSC) material, a first alkali or alkaline earth metal component, and/or a first inorganic oxide.

The first OSC material is preferably selected from the group consisting of cerium oxide, a ceria-zirconia mixed oxide, and an alumina-ceria-zirconia mixed oxide. More preferably, the first OSC material comprises the ceria-zirconia mixed oxide. The ceria-zirconia mixed oxide can further comprise some dopants, such as lanthanum, neodymium, praseodymium, yttrium oxides, etc. In addition, the first OSC material may function as a support material for the first palladium component.

The first palladium component can be supported on either the first inorganic oxide or the first OSC material or both.

The ceria-zirconia mixed oxide can have a molar ratio of zirconia to ceria at least 50:50, preferably, higher than 60:40, more preferably, higher than 75:25.

The first OSC material (e.g., ceria-zirconia mixed oxide) can be from 10 to 90 wt %, preferably, 25-75 wt %, more preferably, 30-60 wt %, based on the total washcoat loading of the first catalytic region.

In some embodiments, the first alkali or alkaline earth metal may be deposited on the first OSC material. Alternatively, or in addition, the first alkali or alkaline earth metal may be deposited on the first inorganic oxide. That is, in some embodiments, the first alkali or alkaline earth metal may be deposited on, i.e. present on, both the first OSC material and the first inorganic oxide.

The first alkali or alkaline earth metal is generally in contact with the first inorganic oxide. Preferably the first alkali or alkaline earth metal is supported on the first inorganic oxide. Alternatively, the first alkali or alkaline earth metal may be in contact with the first OSC material.

The first alkali or alkaline earth metal is preferably barium, or strontium, and mixed oxides or composite oxides thereof. Preferably the barium or strontium, where present, is loaded in an amount of 0.1 to 15 wt %, and more preferably 3 to 10 wt % of barium or strontium, based on the total weight of the first catalytic region.

The first inorganic oxide is preferably an oxide of Groups 2, 3, 4, 5, 13 and 14 elements. The first inorganic oxide is preferably selected from the group consisting of alumina, magnesia, silica, ceria, barium oxides, and mixed oxides or composite oxides thereof. Particularly preferably, the first inorganic oxide is alumina, lanthanum-alumina, ceria, or a magnesia/alumina composite oxide. One especially preferred first inorganic oxide is alumina or lanthanum-alumina composite oxides.

The first OSC material and the first inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

Second Catalytic Region

The second catalytic region can be essentially free of PGM metals other than the second rhodium component.

In some embodiments, the second catalytic region can extend for 100 percent of the axial length L. In other embodiments, the second catalytic region can extend for 50 to 99 percent of the axial length L; preferably, the second catalytic region can extend for 55 to 99 percent; more preferably, 60 to 99 percent or 60 to 95 percent; even more preferably 70 to 90 percent of the axial length L.

The second catalytic region can comprise PGM metals other than the second rhodium component, such as platinum and/or palladium. The second catalytic region can comprise 1-20 g/ft$^3$ of the second rhodium component. Preferably, the second catalytic region can comprise 2-14 g/ft$^3$, more preferably, 3-9 g/ft$^3$ of the second rhodium component.

The second catalytic region can further comprise a second OSC material and/or a second inorganic oxide.

The second OSC material is preferably selected from the group consisting of cerium oxide, a ceria-zirconia mixed oxide, and an alumina-ceria-zirconia mixed oxide. More preferably, the second OSC material comprises the ceria-zirconia mixed oxide. In addition, the second OSC material may further comprise one or more of dopants like lanthanum, neodymium, praseodymium, yttrium etc. Moreover, the second OSC material may have the function as a support material for the second rhodium component.

The second rhodium component can be supported on both the second inorganic oxide and the second OSC material.

The ceria-zirconia mixed oxide can have a molar ratio of zirconia to ceria at least 50:50, preferably, higher than 60:40, more preferably, higher than 75:25.

The second OSC material (e.g., ceria-zirconia mixed oxide) can be from 10 to 90 wt %, preferably, 25-75 wt %, more preferably, 30-60 wt %, based on the total washcoat loading of the second catalytic region.

The second catalytic region can be substantially free of alkali or alkaline earth metal. Reference to "substantially free" means that the recited material may be intentionally or unintentionally present in the recited layer in minor amounts. For example, the alkali or alkaline earth metal might be present in the first and/or the third catalytic regions and some of the alkali or alkaline earth metal might migrate/leach into the second catalytic region unintentionally during the coating processes.

The total washcoat loading of the second catalytic region can be less than 3.5 g/in$^3$, preferably, less than 3.0 g/in$^3$, 2.5 g/in$^3$, or 1.5 g/in$^3$.

The second OSC material and the second inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

Third Catalytic Region

In some embodiments, the third catalytic region can extend for 100 percent of the axial length L. In other embodiments, the third catalytic region can extend for 50 to 99 percent of the axial length L; preferably, the third catalytic region can extend for 55 to 99 percent; more preferably, 60 to 99 percent or 60 to 95 percent; even more preferably 70 to 90 percent of the axial length L.

The third catalytic region can be essentially free of PGM metals other than the third palladium component.

The third catalytic region can comprise 3-380 g/ft$^3$ of the third palladium component. In some embodiments, the third catalytic region can comprise 5-200 g/ft$^3$ or 10-100 g/ft$^3$ of the third palladium component.

The total washcoat loading of the third catalytic region can be less than 3.5 g/in$^3$; preferably, less than 3.0 g/in$^3$ or 2 g/in$^3$; more preferably, less than 1.5 g/in$^3$ or 1.0 g/in$^3$.

The third catalytic region can further comprise a third OSC material, a third alkali or alkaline earth metal component and/or a third inorganic oxide.

The third OSC material is preferably selected from the group consisting of cerium oxide, a ceria-zirconia mixed oxide, and an alumina-ceria-zirconia mixed oxide. Preferably the third OSC material comprises ceria-zirconium mixed oxide, with one or more of dopants of lanthanum, neodymium, yttrium, praseodymium, etc. In addition, the third OSC material may function as a support material for the third rhodium component.

The third OSC material can be from 10 to 90 wt %; preferably, 25-75 wt %; more preferably, 35-65 wt %; based on the total washcoat loading of the third catalytic region.

The third alkali or alkaline earth metal is preferably barium, strontium, mixed oxides or composite oxides thereof. Preferably the barium or strontium, where present, is in an amount of 0.1 to 15 wt %, and more preferably 3 to 10 wt % of barium or strontium, based on the total weight of the third catalytic region.

The third inorganic oxide is preferably an oxide of Groups 2, 3, 4, 5, 13 and 14 elements. The third inorganic oxide is preferably selected from the group consisting of alumina, ceria, magnesia, silica, lanthanum, zirconium, neodymium, praseodymium oxides, and mixed oxides or composite oxides thereof. Particularly preferably, the third inorganic oxide is alumina, a lanthanum/alumina composite oxide, or a zirconium/alumina composite oxide. One especially preferred third inorganic oxide is a lanthanum/alumina composite oxide or a zirconium/alumina composite oxide. The third inorganic oxide may be a support material for the third palladium component, and/or for the third OSC materials.

Preferred the third inorganic oxides preferably have a fresh surface area of greater than 80 m$^2$/g, pore volumes in the range 0.1 to 4 mL/g. High surface area inorganic oxides having a surface area greater than 100 m$^2$/g are particularly preferred, e.g. high surface area alumina. Other preferred the third inorganic oxides include lanthanum/alumina composite oxides.

The third OSC material and the third inorganic oxide can have a weight ratio of 10:1 to 1:10; preferably, 8:1 to 1:8 or 5:1 to 1:5; more preferably, 4:1 to 1:4 or 3:1 to 1:3.

In some embodiments, the first palladium component and the third palladium component has a weight ratio of from 50:1 to 1:50. In further embodiments, the first palladium component and the third palladium component has a weight ratio of from 30:1 to 1:30. In another further embodiment, the first palladium component and the third palladium component has a weight ratio of from 10:1 to 1:10. In yet another further embodiment, the first palladium component and the second palladium component has a weight ratio of from 7:1 to 1:7.

It is preferred that the first palladium component and the third palladium component has a weight ratio of greater than 1:1, more preferred, at least 3:2, 2:1 or 3:1; even more preferred, at least 4:1, 5:1, 6:1 or 7:1.

In some embodiments, the second rhodium component and the third palladium component has a weight ratio of from 60:1 to 1:60. Preferably, the second rhodium component and the third palladium component has a weight ratio of from 40:1 to 1:40. More preferably, the second rhodium component and the third palladium component has a weight ratio of from 30:1 to 1:30. Most preferably, the second rhodium component and the third palladium component has a weight ratio of from 10:1 to 1:10.

The catalyst article of the invention may comprise further components that are known to the skilled person. For example, the compositions of the invention may further comprise at least one binder and/or at least one surfactant. Where a binder is present, dispersible alumina binders are preferred.

Configurations of First, Second, and Third Catalytic Regions

In some embodiments, the first, second, and third catalytic regions each can be independently extend for 100 percent of the axial length L.

The second catalytic region can overlap with the first catalytic region for up to 100 percent of the axial length L (the first catalytic region can overlie the second catalytic region, or the second catalytic region can overlie the first catalytic region). Alternatively, the second catalytic region can overlap with the first catalytic region for up to 90 percent, 80 percent, 70 percent, 60 percent, 50 percent, or even 40 percent of the axial length L. In certain embodiments, the first and second catalytic regions can begin from the same end of the substrate and extend for less than 100% of the axial length L, such as each region independently up to 90 percent, 80 percent, 70 percent, 60 percent, 50 percent, or even 40 percent of the axial length L. In other embodiments, the first and second catalytic regions can begin from the opposite end of the substrate and extend for less than 100% of the axial length L, such as each region independently up to 95 percent, 90 percent, 80 percent, 70 percent, or even 60 percent of the axial length L.

In one aspect of the invention, various configurations of catalytic articles comprising the first, second, and third catalytic regions can be prepared as below.

FIG. 1*a* depicts a configuration in which first catalytic region is a bottom layer directly deposited on the substrate, second catalytic region is a middle layer, and third catalytic region is a top layer.

Figure 1B:
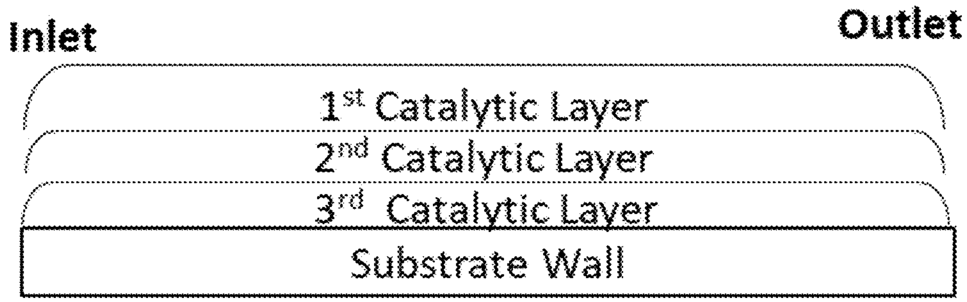
FIG. 1*b* depicts a variation of FIG. 1*a*.

FIG. 1*b* depicts a variation of FIG. 1*a*.

Figure 1C:
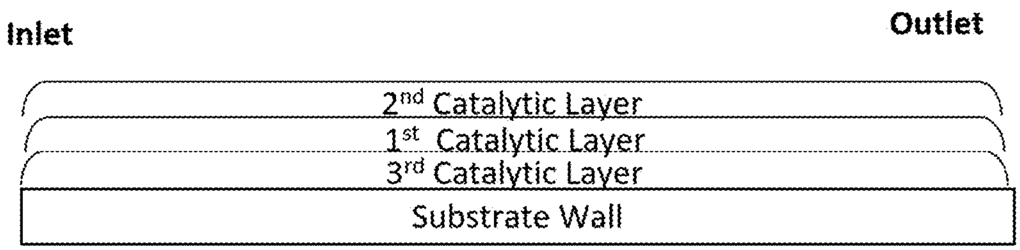
FIG. 1*c* depicts a variation of FIG. 1*a*.

FIG. 1*c* depicts a variation of FIG. 1*a*.

Figure 1D:
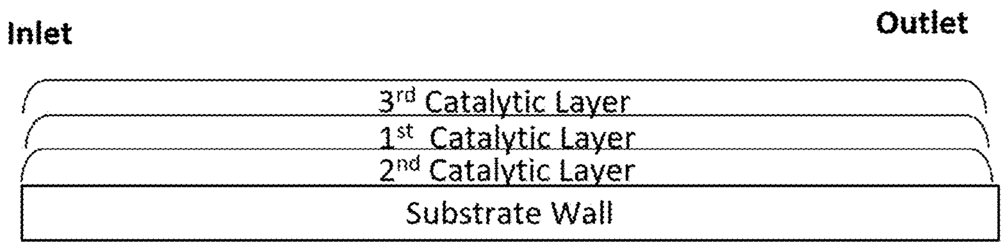
FIG. 1*d* depicts a variation of FIG. 1*a*.

FIG. 1*d* depicts a variation of FIG. 1*a*.

Figure 2A:
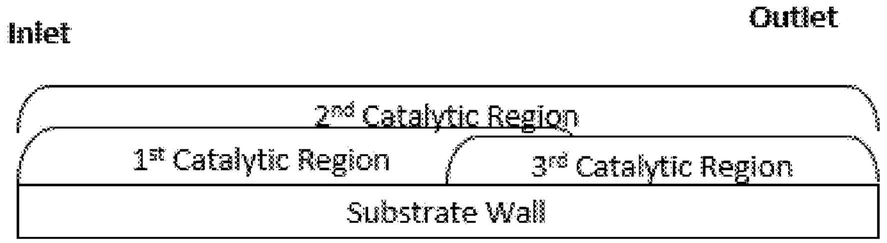
FIG. 2*a* depicts a configuration in which first catalytic region partially overlies with third catalytic region as a bottom layer directly deposited on the substrate, second catalytic region is a top layer.

FIG. 2*a* depicts a configuration in which first catalytic region partially overlies with third catalytic region as a bottom layer directly deposited on the substrate, second catalytic region is a top layer.

Figure 2B:
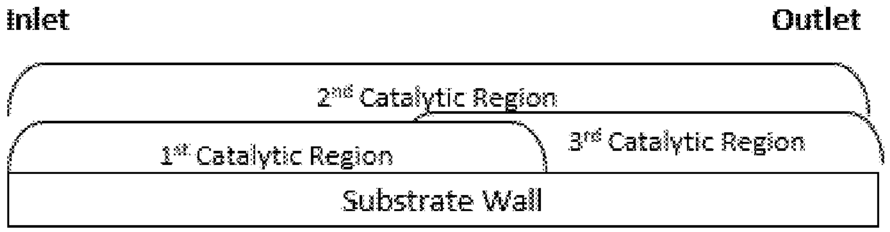
FIG. 2*b* depicts a variation of FIG. 2*a*.

FIG. 2*b* depicts a variation of FIG. 2*a*.

Figure 2C:
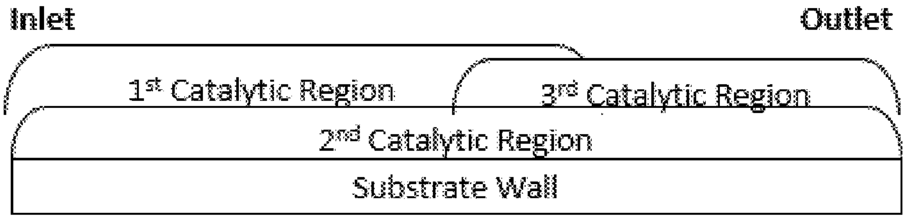
FIG. 2*c* depicts a first configuration in which second catalytic region is a bottom layer directly deposited on the substrate, first catalytic region partially overlies with third catalytic region as a top layer.

FIG. 2*c* depicts a first configuration in which second catalytic region is a bottom layer directly deposited on the substrate, first catalytic region partially overlies with third catalytic region as a top layer.

Figure 2D:
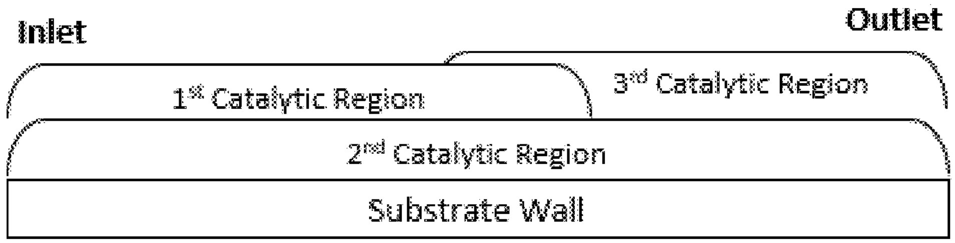
FIG. 2*d* depicts a variation of FIG. 2*c*.

FIG. 2*d* depicts a variation of FIG. 2*c*.

Figure 2E:
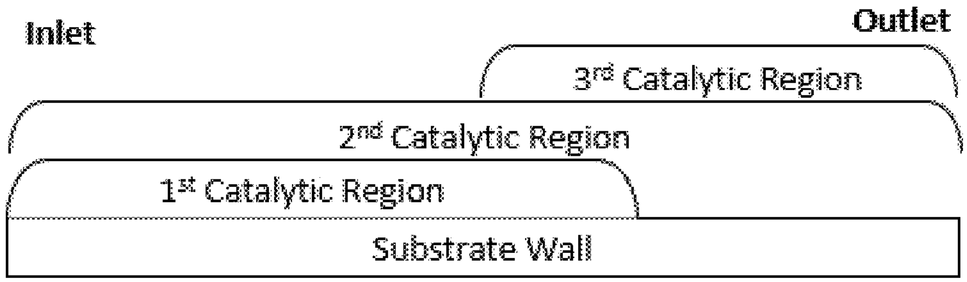
FIG. 2*e* depicts a variation of FIG. 2*a*.

FIG. 2*e* depicts a variation of FIG. 2*a*.

Figure 2F:
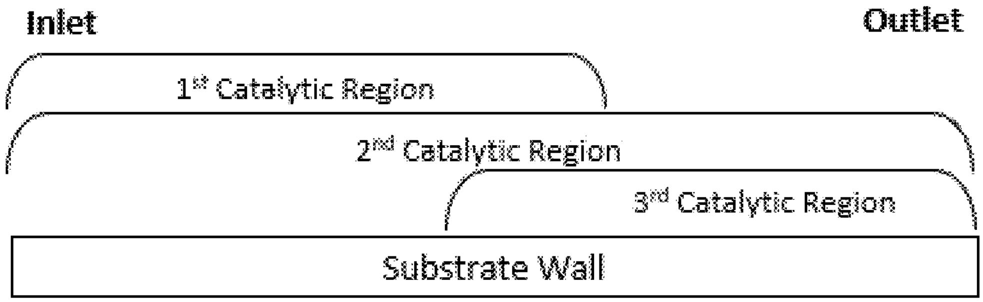
FIG. 2*f* depicts a variation of FIG. 2*c*.

FIG. 2*f* depicts a variation of FIG. 2*c*.

Figure 2G:
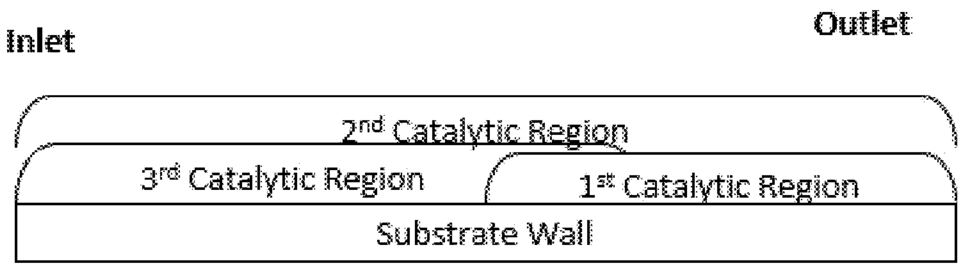
FIG. 2*g* depicts a configuration in which third catalytic region partially overlies with first catalytic region as a bottom layer directly deposited on the substrate, second catalytic region is a top layer.

FIG. 2*g* depicts a configuration in which third catalytic region partially overlies with first catalytic region as a bottom layer directly deposited on the substrate, second catalytic region is a top layer.

Figure 2H:
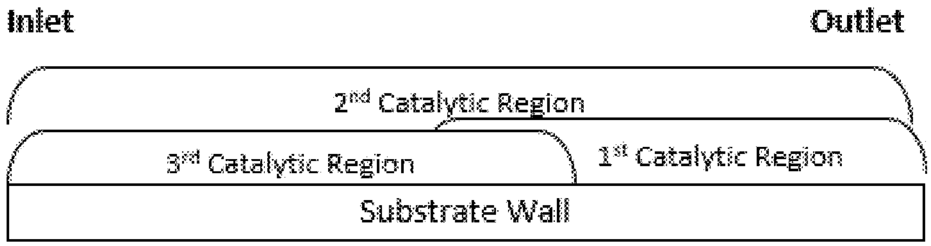
FIG. 2*h* depicts a variation of FIG. 2*g*.

FIG. 2*h* depicts a variation of FIG. 2*g*.

Figure 2I:
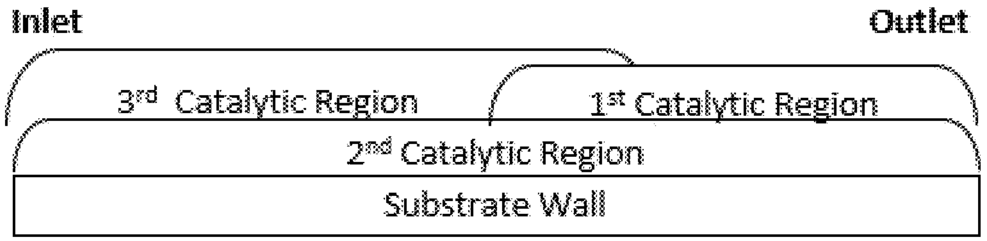
FIG. 2*i* depicts a first configuration in which second catalytic region is a bottom layer directly deposited on the substrate, third catalytic region partially overlies with first catalytic region as a top layer.

FIG. 2*i* depicts a first configuration in which second catalytic region is a bottom layer directly deposited on the substrate, third catalytic region partially overlies with first catalytic region as a top layer.

Figure 2J:
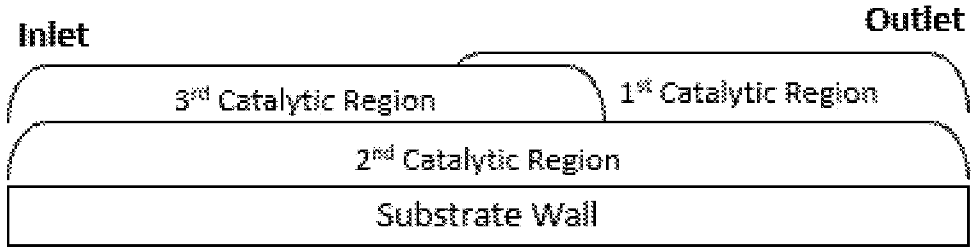
FIG. 2*j* depicts a variation of FIG. 2*i*.

FIG. 2*j* depicts a variation of FIG. 2*i*.

Figure 2K:
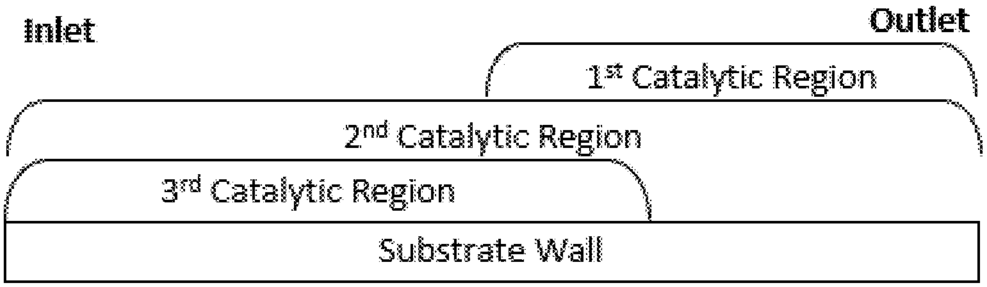
FIG. 2*k* depicts a variation of FIG. 2*g*.
Figure 2L:
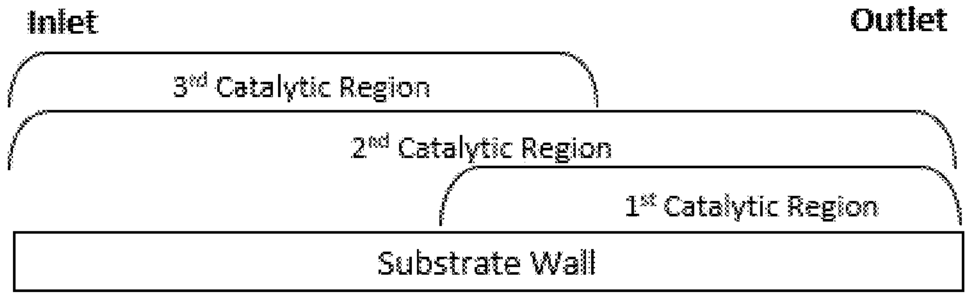
FIG. 2*l* depicts a variation of FIG. 2*i*.

FIG. 2*k* depicts a variation of FIG. 2*g*.

FIG. 2*f* depicts a variation of FIG. 2*i*.

The flow-through monolith substrate has a first face and a second face defining a longitudinal direction there between. The flow-through monolith substrate has a plurality of channels extending between the first face and the second face. The plurality of channels extends in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 300 to 900 channels per square inch, preferably from 400 to 800. For example, on the first face, the density of open first channels and closed second channels is from 600 to 700 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates are well known in the art.

It should be noted that the flow-through monolith substrate described herein is a single component (i.e. a single brick). Nonetheless, when forming an emission treatment system, the substrate used may be formed by adhering together a plurality of channels or by adhering together a plurality of smaller substrates as described herein. Such techniques are well known in the art, as well as suitable casings and configurations of the emission treatment system.

In embodiments wherein the catalyst article of the present comprises a ceramic substrate, the ceramic substrate may be made of any suitable refractory material, e.g., alumina, silica, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the catalyst article of the present invention comprises a metallic substrate, the metallic substrate may be made of any suitable metal, and in particular heat-resistant metals and metal alloys such as titanium and stainless steel as well as ferritic alloys containing iron, nickel, chromium, and/or aluminium in addition to other trace metals.

Another aspect of the present disclosure is directed to a method for treating a vehicular exhaust gas containing $NO_x$, CO, and HC using the catalyst article described herein. Catalytic converters equipped with the TWC made according to this method show improved compared to conventional TWC (with the same PGM loading), also show high conversion rate for $NO_x$, CO, and HC and improves the performance in cold start stage.

Another aspect of the present disclosure is directed to a system for treating vehicular exhaust gas comprising the catalyst article described herein in conjunction with a conduit for transferring the exhaust gas through the system.

Definitions

The term "region" as used herein refers to an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g. region) where the difference in composition when comparing one part of the region with another part of the region is 5% or less, usually 2.5% or less, and most commonly 1% or less.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:

(a) nearer to an inlet end (e.g. open end) of an inlet channel of the substrate than the zone is to a closed end (e.g. blocked or plugged end) of the inlet channel, and/or (b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:

(a) nearer to an outlet end (e.g. an open end) of an outlet channel of the substrate than the zone is to a closed end (e.g. blocked or plugged) of the outlet channel, and/or (b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials or steps, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise."

The expression "essentially free of" as used herein with reference to a material, typically in the context of the content of a region, a layer or a zone, means that the material in a trace amount, such as ≤1% by weight, preferably ≤0.5% by weight, more preferably ≤0.1% by weight. The expression "essentially free of" embraces the expression "does not comprise."

Any reference to an amount of dopant, particularly a total amount, expressed as a % by weight as used herein refers to the weight of the support material or the refractory metal oxide thereof.

The term "loading" as used herein refers to a measurement in units of $g/ft^3$ on a metal weight basis.

The following examples merely illustrate the invention. Those skilled in the art will recognize many variations that are within the spirit of the invention and scope of the claims.

EXAMPLES

Materials

All materials are commercially available and were obtained from known suppliers, unless noted otherwise.

Comparative Catalyst A:

Comparative Catalyst A is a commercial three-way (Pd—Rh) catalyst with a double-layered structure. The bottom layer consists of Pd supported on a washcoat of a first CeZr mixed oxide, La-stabilized alumina, and Ba promotor. The washcoat loading of the bottom layer was about 2.0 $g/in^3$ with a Pd loading of 133 $g/ft^3$. This washcoat was coated from the inlet and outlet face of a ceramic substrate (750 cpsi, 3.0 mil wall thickness) using standard coating procedures with coating depth targeted of 50% of the substrate length, followed by drying and calcination.

The top layer consists of Rh supported on a washcoat of a second CeZr mixed oxide, La-stabilized alumina. The washcoat loading of the top layer was about 2.0 $g/in^3$ with a Rh loading of 7 $g/ft^3$. This washcoat was coated from the inlet and outlet face of a ceramic substrate (750 cpsi, 3.0 mil wall thickness) containing the bottom layer washcoat from above, using standard coating procedures with coating depth targeted of 50% of the substrate length, followed by drying and calcination.

Inventive Catalyst 1 (According to FIG. 1*c*):

Third Catalytic Layer (Bottom Layer):

The third catalytic layer consists of Pd supported on a washcoat of a third CeZr mixed oxide, La-stabilized alumina and Ba promotor. The washcoat loading of the third catalytic layer was about 1.0 g/in$^3$ with a 66.5 g/ft$^3$ of Pd.

The third catalytic layer was coated from the inlet and outlet face of the ceramic substrate (750 cpsi, 3.0 mil wall thickness), using standard coating procedures with coating depth targeted of 50% of the substrate length, followed by drying and calcination.

First Catalytic Layer (Middle Layer):

The first catalytic layer consists of Pd supported on a washcoat of a first CeZr mixed oxide, La-stabilized alumina and Ba promotor. The washcoat loading of the first catalytic region was about 1.0 g/in$^3$ with a 66.5 g/ft$^3$ of Pd.

The first catalytic layer was coated from the inlet and outlet face of a ceramic substrate (750 cpsi, 3.0 mil wall thickness) containing the third catalytic layer from above using standard coating procedures with coating depth targeted of 50% of the substrate length, followed by drying and calcination.

Second Catalytic Layer (Top Layer):

The second catalytic layer was prepared and coated on the top of the first catalytic layer the same way as the top Rh layer of Comparative Catalyst A.

Inventive Catalyst 2 (According to FIG. 1*c*):

Third Catalytic Layer (Bottom Layer):

The third catalytic layer consists of Pd supported on a washcoat of a third CeZr mixed oxide, La-stabilized alumina and Ba promotor. The washcoat loading of the third catalytic layer was about 1.0 g/in$^3$ with a 98 g/ft$^3$ of Pd.

The third catalytic layer was coated from the inlet and outlet face of the ceramic substrate (750 cpsi, 3.0 mil wall thickness) using standard coating procedures with coating depth targeted of 50% of the substrate length, followed by drying and calcination.

First Catalytic Layer (Middle Layer):

The first catalytic layer consists of Pd supported on a washcoat of a first CeZr mixed oxide, La-stabilized alumina and Ba promotor. The washcoat loading of the first catalytic region was about 1.0 g/in$^3$ with a 35 g/ft$^3$ of Pd.

The first catalytic layer was coated from the inlet and outlet face of a ceramic substrate (750 cpsi, 3.0 mil wall thickness) containing the third catalytic layer from above using standard coating procedures with coating depth targeted of 50% of the substrate length, followed by drying and calcination.

Second Catalytic Layer (Top Layer):

The second catalytic layer was prepared and coated on the top of the first catalytic layer the same way as the top Rh layer of Comparative Catalyst A.

Table 1 below shows a PGM loading summary of Comparative Catalyst A and Inventive Catalysts 1 and 2.

TABLE 1

Summary of All Catalysts

| | Bottom layer Pd loading (g/ft$^3$) | | Top layer Rh loading (g/ft$^3$) | Pd to Rh weight ratio |
|---|---|---|---|---|
| Comparative Catalyst A | 133 | | 7 | 19:1 |
| | Third Catalytic layer Pd loading (g/ft$^3$) | First Catalytic layer Pd loading (g/ft$^3$) | Second Catalytic layer Rh loading (g/ft$^3$) | Weight ratio of 1$^{st}$ Pd to 2$^{nd}$ Rh |
| Inventive Catalyst 1 | 66.5 | 66.5 | 7 | ~10:1 |
| Inventive Catalyst 2 | 98 | 35 | 7 | 5:1 |

Example 1: Cold RDE Test in Engine Bench Testing

All catalysts were engine bench aged for 50 hours with a stoic/fuel cut aging cycle, targeting a peak catalyst bed temperature of 1000° C. The catalysts were tested using a 2.0 L engine bench dynamometer performing a bespoke OEM designed real-world driving (RDE) cycle comprising acceleration and fuel shut-off conditions representing a cold urban, rural, motorway and hot urban speed phases. The cycle length was 2700 seconds from ambient-soaked conditions, reaching an approximate peak catalyst bed temperature of 700° C. and 250 kg/h mass air flow rate. $NO_x$, CO, THC and $NH_3$ emissions at post catalyst position were measured and accumulated mass of each species was calculated across the cycle. Three runs were conducted on each catalyst formulation, and the averaged accumulative emissions of three runs against time are plotted and shown in the figures below.

Figure 3A:
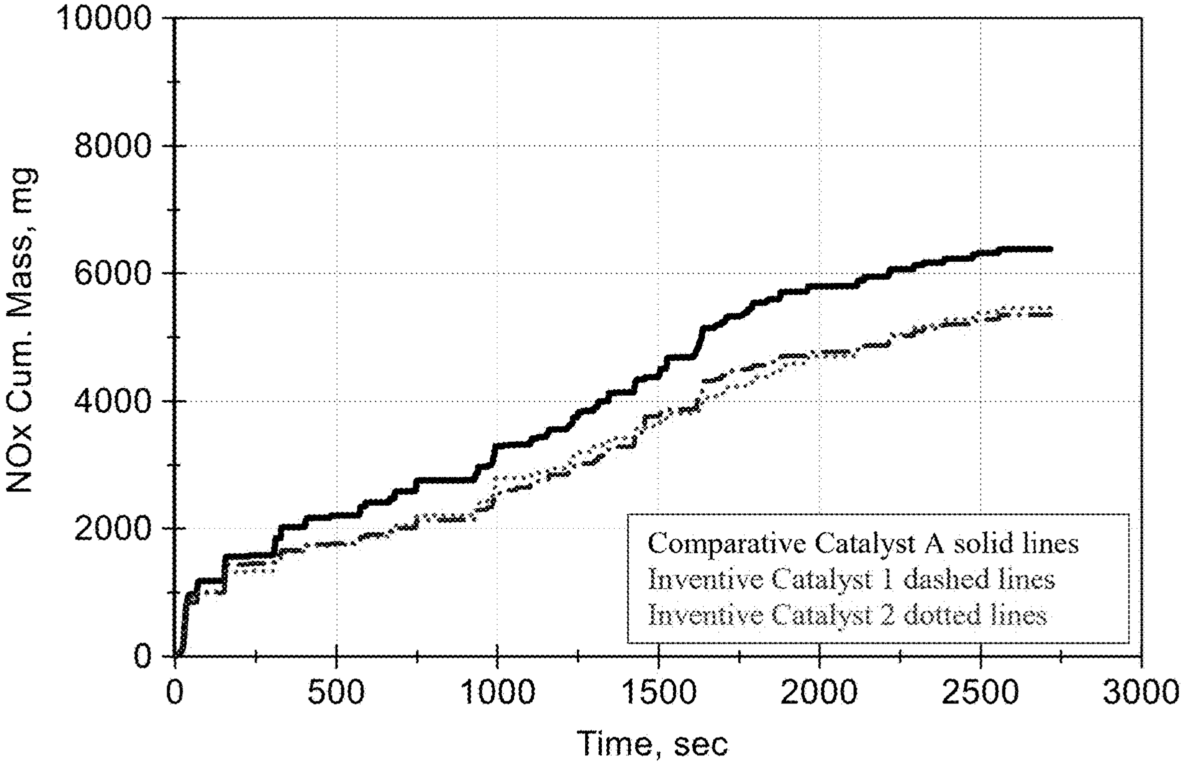
FIG. 3*a* shows $NO_x$ emission of Comparative Catalyst A and Inventive Catalyst 1 and Inventive Catalyst 2 during the cold RDE cycle.
Figure 3B:
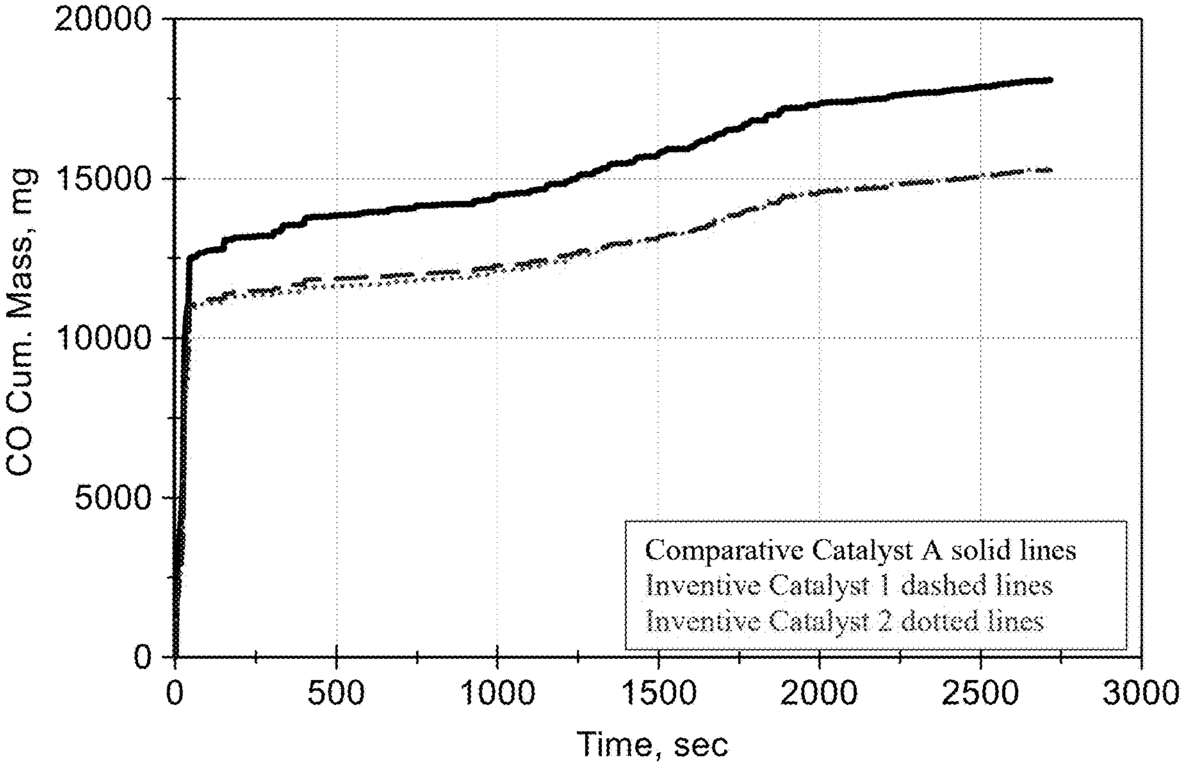
FIG. 3*b* shows CO emission of Comparative Catalyst A and Inventive Catalyst 1 and Inventive Catalyst 2 during the cold RDE cycle.
Figure 3C:
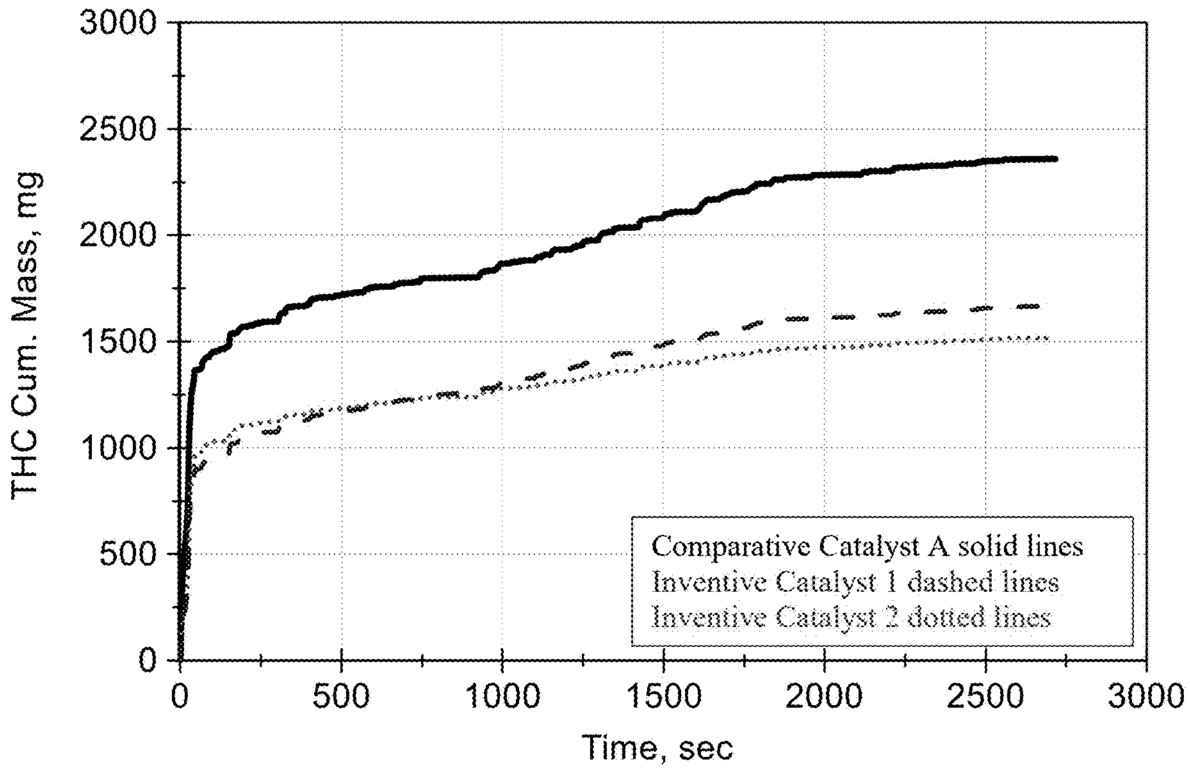
FIG. 3*c* shows THC emission of Comparative Catalyst A and Inventive Catalyst 1 and Inventive Catalyst 2 during the cold RDE cycle.
Figure 3D:
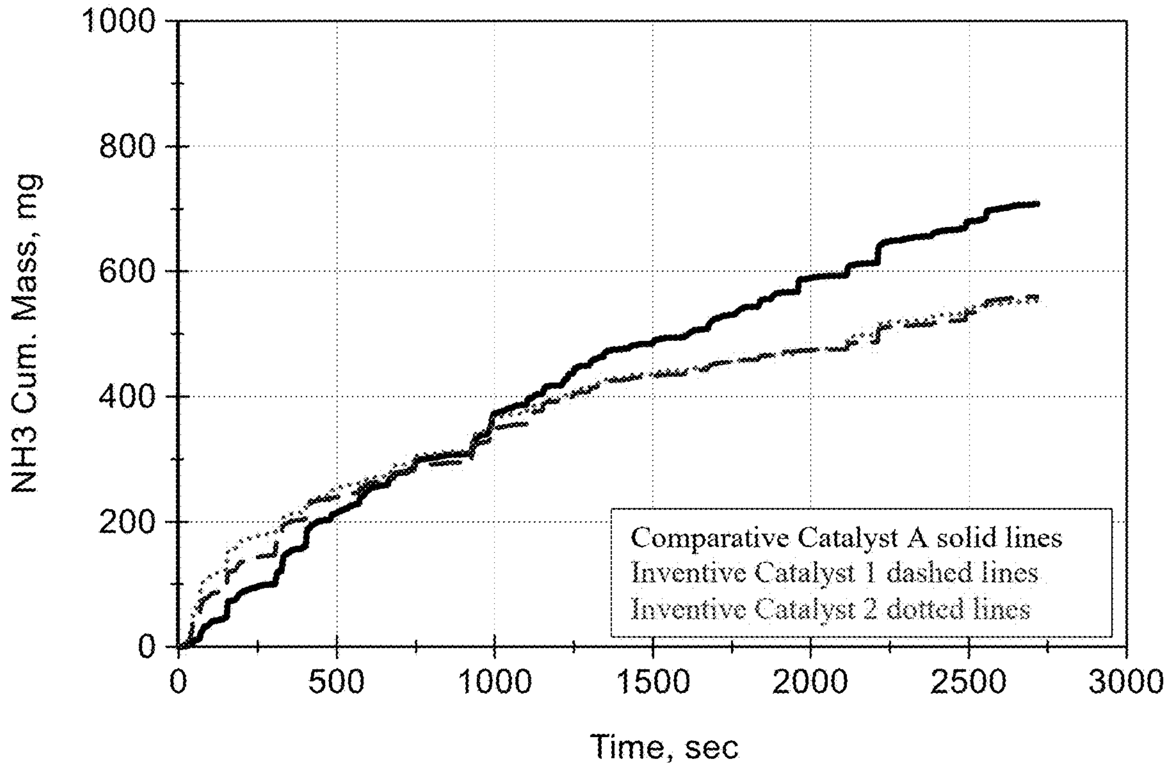
FIG. 3*d* shows $NH_3$ emission of Comparative Catalyst A and Inventive Catalyst 1 and Inventive Catalyst 2 during the cold RDE cycle.

FIG. 3*a* is the $NO_x$ emission of Comparative Catalyst A and Inventive Catalyst 1 and Inventive Catalyst 2 during the cold RDE cycle. It is very clear that both Inventive Catalysts having optimal Pd loading in the first catalytic layer adjacent to the Rh containing layer gave lower $NO_x$ emissions across the entire cold RDE driving cycle. CO, THC and $NH_3$ emission are shown in FIG. 3*b*, FIG. 3*c* and FIG. 3*d*, respectively, which demonstrate similar trends.

We claim:

1. A catalyst article for treating exhaust gas comprising:
- a substrate comprising an inlet end, an outlet end with an axial length L;
- a first catalytic region comprising a first palladium component, a first oxygen storage capacity (OSC) material, and a first inorganic oxide, wherein the first OSC material and the first inorganic oxide have a weight ratio of 10:1 to 1:10;
- a second catalytic region comprising a second rhodium component;
- a third catalytic region comprising a third palladium component;
- wherein the first catalytic region is adjacent to the second catalytic region;
- wherein the first palladium component and the second rhodium component have a weight ratio of from 3:1 to 10:1, based on element; and,
- wherein the second catalytic region extends for 100% of the axial length L.

2. The catalyst article of claim 1 wherein the first catalytic region comprises 0.0001-0.013 g/cm$^3$ (3-380 g/ft$^3$) of the first palladium component.

3. The catalyst article of claim 1, wherein the second catalytic region comprises 0.00004-0.0007 g/cm$^3$ (1-20 g/ft$^3$) of the second rhodium component.

4. The catalyst article of claim 1, wherein the first catalytic region further comprises a first alkali or alkaline earth metal component.

5. The catalyst article of claim 4, wherein the first OSC material is selected from the group consisting of cerium oxide, a ceria-zirconia mixed oxide, and an alumina-ceria-zirconia mixed oxide.

6. The catalyst article of claim 4, wherein the first alkali or alkaline earth metal is barium, strontium, or mixed oxides or composite oxide of barium and strontium.

7. The catalyst article of claim 6, wherein the first alkali or alkaline earth metal is loaded in an amount of 0.1 to 15 wt %, based on the total washcoat weight of the first catalytic region.

8. The catalyst article of claim 4, wherein the first inorganic oxide is selected from the group consisting of alumina, ceria, magnesia, silica, lanthanum, neodymium, praseodymium, yttrium oxides, and mixed oxides or composite oxides thereof.

9. The catalyst article of claim 1, wherein the second catalytic region further comprises a second OSC material and/or a second inorganic oxide.

10. The catalyst article of claim 9, wherein the second OSC material is selected from the group consisting of cerium oxide, a ceria-zirconia mixed oxide, and an alumina-ceria-zirconia mixed oxide.

11. The catalyst article of claim 9, wherein the second inorganic oxide is selected from the group consisting of alumina, ceria, magnesia, silica, lanthanum, neodymium, praseodymium, yttrium oxides, and mixed oxides or composite oxides thereof.

12. The catalyst article of claim 1, wherein the third catalytic region comprises 0.0001-0.013 $g/cm^3$ (3-380 $g/ft^3$) of the third palladium component.

13. The catalyst article of claim 1, wherein the third catalytic region further comprises a third OSC material, a third alkali or alkaline earth metal component, and/or a third inorganic oxide.

14. The catalyst article of claim 13, wherein the third OSC material is selected from the group consisting of cerium oxide, a ceria-zirconia mixed oxide, and an alumina-ceria-zirconia mixed oxide.

15. The catalyst article of claim 13, wherein the third inorganic oxide is selected from the group consisting of alumina, ceria, magnesia, silica, lanthanum, neodymium, praseodymium, yttrium oxides, and mixed oxides or composite oxides thereof.

16. The catalyst article of claim 13, wherein the third alkali or alkaline earth metal is barium, strontium, or mixed oxides or composite oxide of barium and strontium.

17. The catalyst article of claim 16, wherein the third alkali or alkaline earth metal is loaded in an amount of 0.1 to 15 wt %, based on the total weight of the third catalytic region.

18. The catalyst article of claim 1, wherein the substrate is a flow-through monolith.

19. An emission treatment system for treating a flow of a combustion exhaust gas comprising the catalyst article of claim 1.

20. A method of treating an exhaust gas from an internal combustion engine comprising contacting the exhaust gas with the catalyst article of claim 1.

* * * * *